United States Patent
Deng et al.

(10) Patent No.: US 11,064,435 B1
(45) Date of Patent: Jul. 13, 2021

(54) RAPID SYNC UP MECHANISM FOR TRAFFIC CONTROL BETWEEN TWO SYSTEMS

(71) Applicant: Marvell International Ltd., Hamilton (BM)

(72) Inventors: Yuanhua Deng, Allen, TX (US); Zheng Cao, Union City, CA (US); Xinyu Zang, Palo Alto, CA (US)

(73) Assignee: MARVELL ASIA PTE, LTD., Singapore (SG)

( * ) Notice: Subject to any disclaimer, the term of this patent is extended or adjusted under 35 U.S.C. 154(b) by 202 days.

(21) Appl. No.: 16/264,010

(22) Filed: Jan. 31, 2019

Related U.S. Application Data

(60) Provisional application No. 62/630,118, filed on Feb. 13, 2018.

(51) Int. Cl.
*H04W 48/02* (2009.01)
*H04W 52/02* (2009.01)
*H04W 88/12* (2009.01)
*H04W 56/00* (2009.01)
*H04W 40/24* (2009.01)
(Continued)

(52) U.S. Cl.
CPC ....... *H04W 52/0229* (2013.01); *H04L 1/1614* (2013.01); *H04W 40/24* (2013.01); *H04W 56/001* (2013.01); *H04W 84/12* (2013.01)

(58) Field of Classification Search
None
See application file for complete search history.

(56) References Cited

U.S. PATENT DOCUMENTS

| 5,636,220 A * | 6/1997 | Vook ...................... H04L 47/40 |
| | | 370/338 |
| 2005/0169200 A1* | 8/2005 | Fischer ............. H04W 52/0212 |
| | | 370/311 |

(Continued)

*Primary Examiner* — Duc T Duong

(57) ABSTRACT

Aspects of the disclosure provide methods and apparatuses for data communication. In some embodiments, an apparatus for data communication between a host and a plurality of station devices includes an interface circuit, a medium access controller (MAC) circuit, a control circuit, and a streaming circuit. The interface circuit is configured to receive a data packet from the host, and the data packet includes a bitmap addressing the data packet to one of the plurality of station devices. The medium access controller (MAC) circuit is configured to detect a sleep status of the one of the plurality of station devices. The control circuit is configured to adjust a bit mask based on the sleep status of the one of the plurality of station devices, so that the bit mask indicates the sleep status the one of the plurality of station devices. The streaming circuit is coupled between the interface circuit and the MAC circuit. The streaming circuit is configured to receive the data packet addressed to station devices, determine the sleep status of the one of the plurality of station devices based on the bit mask and the bitmap in the data packet, and transmit the data packet to the MAC circuit when the sleep status of the one of the plurality of station devices is in a wake state, otherwise, transmit the data packet to the control circuit when the sleep status of the one of the plurality of station devices is in a sleep state.

20 Claims, 5 Drawing Sheets

(51) Int. Cl.
    *H04L 1/16*         (2006.01)
    *H04W 84/12*     (2009.01)

(56) References Cited

U.S. PATENT DOCUMENTS

| | | | |
|---|---|---|---|
| 2008/0310528 A1* | 12/2008 | Soong | H04L 5/0094 375/260 |
| 2009/0147714 A1* | 6/2009 | Jain | H04W 52/0216 370/311 |
| 2011/0249605 A1* | 10/2011 | Kwon | H04W 52/0235 370/311 |
| 2011/0299613 A1* | 12/2011 | Duff | H04L 43/10 375/260 |
| 2012/0127920 A1* | 5/2012 | Kobayashi | H04W 4/08 370/315 |
| 2013/0064175 A1* | 3/2013 | Pandey | H04W 8/005 370/328 |
| 2014/0146725 A1* | 5/2014 | Merlin | H04W 52/0206 370/311 |
| 2014/0241228 A1* | 8/2014 | Kobayashi | H04W 52/0206 370/311 |
| 2015/0358067 A1* | 12/2015 | Zhang | H04W 52/0216 370/315 |
| 2016/0112955 A1* | 4/2016 | Grau | H04W 52/0235 370/311 |
| 2018/0014316 A1* | 1/2018 | Guo | H04W 72/1289 |
| 2018/0092036 A1* | 3/2018 | Azizi | H04W 12/0609 |
| 2018/0227847 A1* | 8/2018 | Butt | H04W 52/0216 |
| 2018/0255422 A1* | 9/2018 | Montemurro | H04W 48/20 |

* cited by examiner

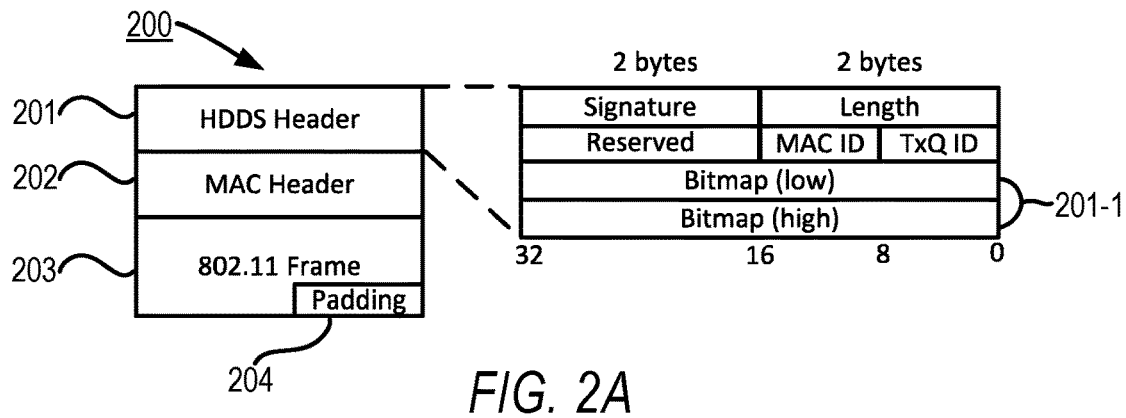
FIG. 2A
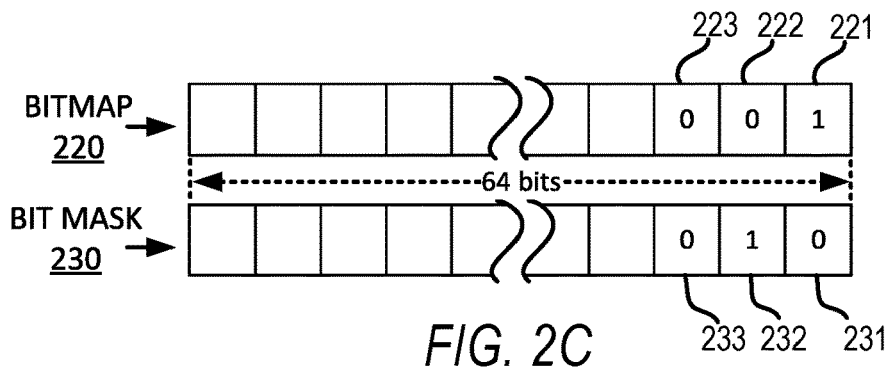
FIG. 2B
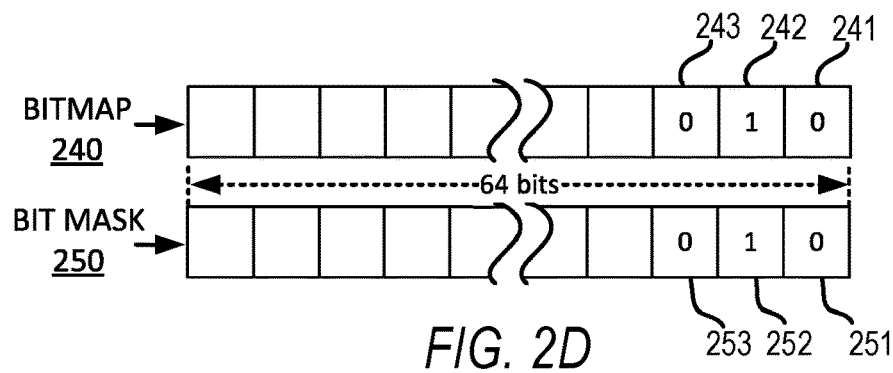
FIG. 2C
FIG. 2D

RAPID SYNC UP MECHANISM FOR TRAFFIC CONTROL BETWEEN TWO SYSTEMS

INCORPORATION BY REFERENCE

This present disclosure claims the benefit of U.S. Provisional Application No. 62/630,118, "Rapid Sync Up Mechanism for Traffic Control between Two Systems" filed on Feb. 13, 2018, which is incorporated herein by reference in its entirety.

BACKGROUND

A wireless local area network (WLAN) is typically used in a home, school, office building, store, shopping mall and the like to link two or more devices using wireless connections within a limited area to a network. The WLAN allows users to move around within the limited area while remaining connected to the network. The WLAN can be configured to further provide connections to other networks, such as a wide area network or the Internet. Generally, WLANs are implemented based on standards, such as IEEE 802.11 standards, and the like.

SUMMARY

Aspects of the disclosure provide an apparatus for data communication between a host and a plurality of station devices includes an interface circuit, a medium access controller (MAC) circuit, a control circuit, and a streaming circuit. The interface circuit is configured to receive a data packet from the host, and the data packet includes a bitmap addressing the data packet to one of the plurality of station devices. The medium access controller (MAC) circuit is configured to detect a sleep status of the one of the plurality of station devices. The control circuit is configured to adjust a bit mask based on the sleep status of the one of the plurality of station devices, so that the bit mask indicates the sleep status the one of the plurality of station devices. The streaming circuit is coupled between the interface circuit and the MAC circuit. The streaming is configured to receive the data packet addressed to the one of the plurality of station devices, determine the sleep status of the one of the plurality of station devices based on the bit mask and the bitmap in the data packet, and transmit the data packet to the MAC circuit when the sleep status of the one of the plurality of station devices is in a wake state, otherwise, transmit the data packet to the control circuit when the sleep status of the one of the plurality of station devices is in a sleep state.

In some embodiments, the control circuit further comprises a queue corresponding to the one of the plurality of station devices.

In an embodiment, when the streaming circuit indicates that the sleep status of the one of the plurality of station devices is in the sleep state, the streaming circuit transmits the data packet to the queue corresponding to the one of the plurality of station devices.

In another embodiment, when the bit mask is changed from the sleep state to the wake state, the control circuit moves data packets previously stored in the queue corresponding to the one of the plurality of station devices to the MAC circuit and updates the bit mask to reflect the wake state of the one of the plurality of station devices.

In a third embodiment, when the bit mask is changed from the wake state to the sleep state, the control circuit moves data packets for the one of the plurality of station devices from the MAC circuit to the queue corresponding to the one of the plurality of station devices and updates the bit mask to reflect the sleep state of the one of the plurality of station devices.

In some embodiments, the sleep status of the one of the plurality of station devices is received by the MAC circuit from the one of the plurality of station devices and the received sleep status is transmitted to the control circuit to update the bit mask based on the sleep status of the one of the plurality of station devices.

In some embodiments, the control circuit is a firmware that includes a series of instructions stored in hardware circuit and provides control functions to the hardware circuit.

In some embodiments, the MAC circuit further comprises a plurality of first queues for receiving data from the streaming circuit and a second queue for receiving data from the control circuit.

In some embodiments, the MAC circuit is further configured to detect the sleep status of the one of the plurality of station devices by detecting a reception of a power management (PM) bit indicating the sleep status of the one of the plurality of station devices and notify the control circuit to update the bit mask to reflect the sleep status of the one of plurality of station devices.

In some embodiments, the streaming circuit determines the sleep status of the one of the plurality of station devices by performing a logic BIT AND operation on the bit mask and the bitmap. Accordingly, the one of the plurality of station devices is determined to be in the wake state when the logic BIT AND operation results in a non-zero value.

In some embodiments, the control circuit is further configured to create a mapping between the one of the plurality of station devices and the bit mask in the streaming circuit and transmit the mapping to the host so that a mapping between the one of the plurality of station devices and the bitmap in the data packet is the same as the mapping between the one of the plurality of station devices and the bit mask in the streaming circuit.

Aspects of the disclosure also provide a method for data communication. In some embodiments, the method comprises receiving a data packet addressed to a station device from a host and determining a sleep status of the station device. The sleep status includes one of a sleep state and a wake state. When it is determined that the sleep status of the station device is in the wake state, the method comprises transmitting the received data packet to a MAC circuit. Otherwise, when it is determined that the sleep status of the station device is in the sleep state, the method comprises storing the received data packet in a control circuit.

Aspects of the disclosure further provide a communication device in charge of communication between a host device and station devices. The communication device comprises an interface circuit configured to receive data from the host device that is addressed to a station device and a medium access controller (MAC) circuit configured to detect a sleep status of the station device. The communication device also comprises a controller configured to adjust a bit mask based on the sleep status of the station device, so that the bit mask indicates the sleep status of the station device. The communication device further comprises a streaming circuit coupled between the interface circuit and the MAC circuit. The streaming circuit is configured to receive the data that is addressed to the station device and transmit the data to the MAC circuit when the bit mask indicates that the sleep status of the station device is in a wake state, and transmit the data to the control circuit when the bit mask indicates that the sleep status of the station device is in a sleep state.

BRIEF DESCRIPTION OF THE DRAWINGS

Various embodiments of this disclosure that are proposed as examples will be described in detail with reference to the following figures, wherein like numerals reference like elements, and wherein:

FIG. 2A shows an exemplary data packet structure according to an embodiment of the disclosure;

FIG. 2B shows an exemplary function table corresponding to the data packet of FIG. 2A according to an embodiment of the disclosure;

FIG. 2C shows an exemplary bit mask and bitmap according to an embodiment of the disclosure;

FIG. 2D shows another exemplary bit mask and an exemplary bitmap according to an embodiment of the disclosure:

DETAILED DESCRIPTION OF EMBODIMENTS

Figure 1:
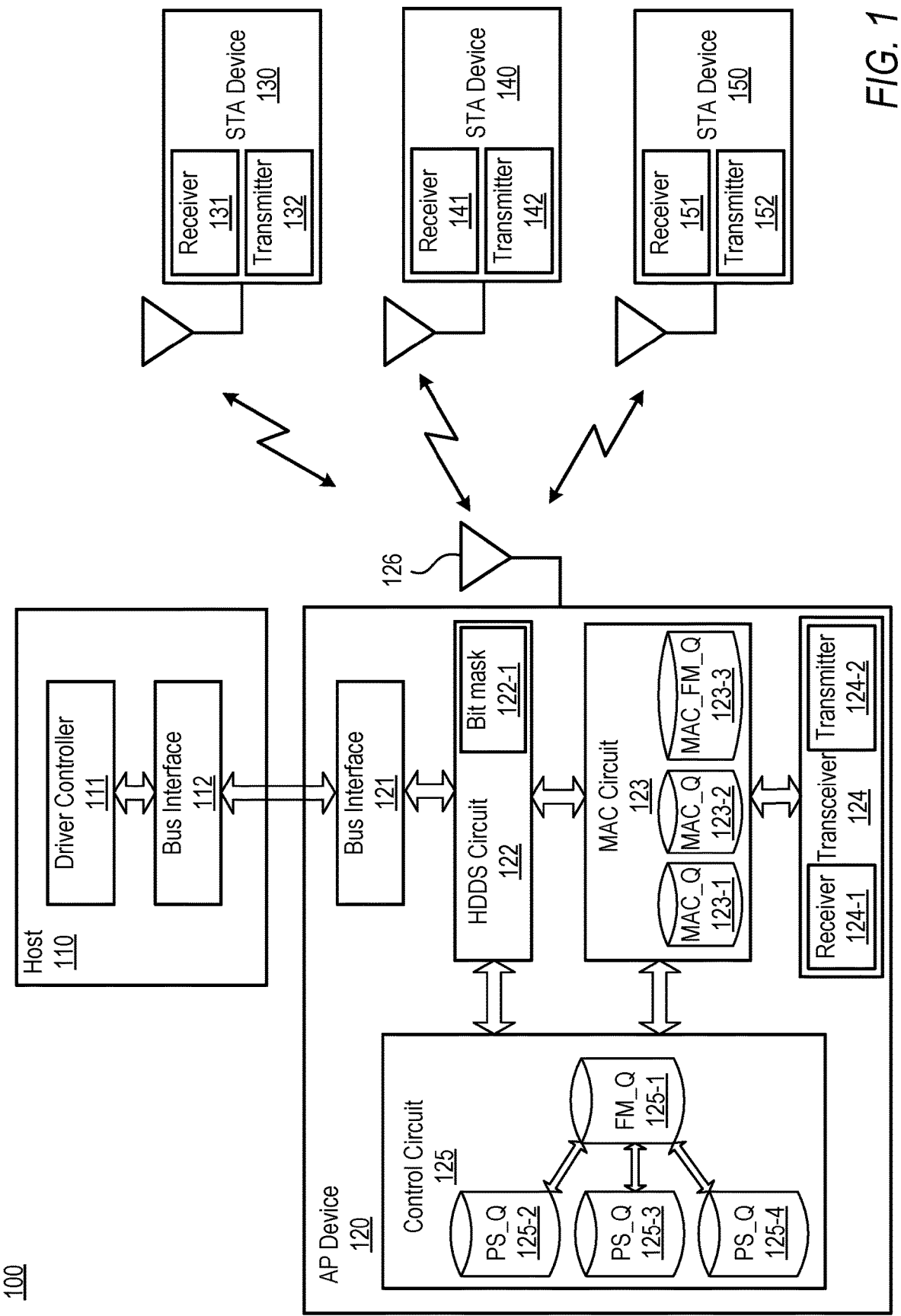
FIG. 1 shows an exemplary block diagram of a local communication network according to an embodiment of the disclosure.

FIG. 1 shows an exemplary block diagram of a local communication network 100 according to embodiments of the disclosure. The network 100 can include a host 110, an access point device (AP) 120, and a plurality of station (STA) devices 130, 140, and 150. As shown, the access point device 120 is coupled to the host 110 and the station devices 130, 140, and 150 are wirelessly coupled with access point device 120.

In the network 100, the access point device 120 can be configured to receive data from the host 110 in a first format that is addressed one of the station devices 130, 140, or 150. The access point device 120 can then convert the received data from the first format into a second format and, when it is determined that a sleep status of a respective station device 130, 140, or 150 is in a wake state, the access point device 120 can transmit the received data to the targeted station device 130, 140, or 150 in the second format. Otherwise, when the sleep status of the targeted station device 130, 140, or 150 is in a sleep state, the access point device 120 can hold the received data for later transmission once the sleep status of the station device 130, 140, or 150 returns to a wake state.

The host 110 can be any device that functions to transmit and receive data to/from the station devices 130-150 via the access point device 120. For example, the host can be a computer that generates a batch of data packets for the station devices 130-150 and transmits the batch of data packets to the station devices 130-150 via the access point device 120. The host can also be an application component in a smart phone.

The access point device 120 is an intermediate device that is coupled between the host 110 and the station devices 130-150 for conducting wireless communication therebetween. For example, the access point device 120 can be a Wi-Fi chip that receives data packets for the station devices 130-150 from the host and then transmits the data packets to the station devices 130-150, and vice-versa.

Each of the station devices 130, 140, and 150 in the network 100 can be any suitable device that communicates wirelessly with the access point device 120. For example, the station devices 130, 140, and 150 can be a desktop computer, a laptop computer, a tablet computer, a smart phone, a personal digital assistant (PDA), a smart watch, a smart camera, a smart TV, a smart voice recorder, a wearable device, printer, and the like. According to an aspect of the disclosure, the station devices 130, 140, and 150 devices in the network 100 are implemented using the same or different versions of a wireless standard, such as the various IEEE 802.11 standards.

In operation, the access point device 120 serves as a wireless access point for the station devices 130, 140, and 150. For example, the access point device 120 can serve as a Wi-Fi hotspot for station devices 130, 140, and 150. In such an example, the station devices 130, 140, and 150 communicate through the access point device 120 to the host 110 which can be connected to other networks, such as the Internet, using a wire network. Another example is that a smart phone, which includes both host 110 and device 120, works as a Wi-Fi hotspot, and the host 110 may be connected to a mobile/cellular network through a mobile device. Accordingly, the access point device 120 includes hardware configured to and/or software configured to serve as a bridge to allow the station devices 130, 140, and 150 to connect to other the networks. The communication between the access point device 120 and the station devices 130, 140, and 150 is implemented by wireless transmitting and receiving data packets through corresponding antennas.

According to an aspect of the disclosure, the station devices 130, 140, and 150 include a sleep mode that assists in reducing power consumption of the station device. A sleep status of the station device can be used to indicate a sleeping state of the station device by having at least two states: a wake state and a sleep state. In the wake state, the station device performs operation with rated power, such as associating and synchronizing with an access point, and receiving and transmitting data with the access point. In the sleep state, the station device performs partial operation by switching off hardware and/or stopping running software in order to reduce power consumption. The sleep status of the station devices 130, 140, or 150 can be shared so that other devices of the network 100 can know whether a particular station device 130, 140, or 150 is in a wake or sleep state.

In an example, a receiver 131 of the station device 130 is configured to receive data packets from the access point device 120. When the station device 130 is asleep, the sleep status of the station device 130 is set to a sleep state and the receiver 131 is switched off during a period of time so that the power consumption of the receiver 131 can be reduced. Accordingly, during that period of time, the station device 130 is not ready for data packet reception. In the same example, when the station device 130 is awake, the sleep status of the station device 130 is set to a wake state and the receiver 131 is switched on to be ready for data packet reception.

In an infrastructure mode wireless network in which a station device (e.g., the device 130) connects to an access point device (e.g., the device 120) via a wireless link, the access point device 120 is aware of a current sleep status of the station device 130 and transmits data packets to the station device 130 only when the station device 130 is in a wake state in order to avoid the data packet loss. Accordingly, the station device 130 notifies the access point device 120 every time it switches its sleep status. Knowing the sleep status of the station device 130, the access point device 120 determines whether to transmit a data packet to the station device 130. If the access point is aware that the station device 130 is in a wake state, the access point device 120 transmits the data packet to the station device 130. However, if the access point device 120 is aware that the station device 130 is in a sleep state, the access point device 120 determines to defer transmission of the data packet to the station device 130 for later, and instead temporarily store the data packet.

In operation, the station device 130 can transmit a data packet including a power management (PM) bit to the access point device 120 to notify a current sleep status that the station device 130 is in. In an example, when entering a wake state, the station device 130 sends to the access point device 120 a data packet with a PM bit set to 0. After becoming aware of the wake state of the station device 130, the access point device 120 executes data transmission towards to the station device 130. In the same example, when entering a sleep state, the station device 130 transmits a data packet to the access point device 120 with a PM bit set to 1. After being notified of the sleep state of the station device 130, the access point device 120 holds data transmission towards to the station device 130 and stores the corresponding data packets. In such an example, a PM bit 0→1 indicates a transition of the sleep status from the wake state to the sleep state, so the station device 130 temporarily no longer receives data packets. Once the access point device 120 receives a PM bit 0→1, it starts buffering the data packets directed to the station device 130 and pauses the transmission of the data packets towards to the station device 130. In the same example, a PM bit 1→0 indicates a transition from the sleep state to the wake state so that data packets reception of the station device 130 now becomes available. Once the access point device 120 receives a PM bit 1→0, it starts transmitting buffered data packets towards to the station device 130 and resumes the transmission of the data packets towards to the station device 130.

The host 110 may be configured to connect other parts of the network 100 via a wire or wireless technology. In an example, the host 110 receives from other part of the network 100 a data packet addressed to the station device 130 and sends the data packet to the access point device 120. In another example, the host 110 generates a data packet addressed to the station device 130 and transmits the data packet to the access point device 120. In both examples, the access point device 120 receives the data packet addressed to the station device 130 from the host 110 and parses the data packet to determine whether the station device 130 is in a wake state. When it is determined that the station device 130 is in the wake state, the access point device 120 wireless transmits the data packet to the station device 130. When it is determined that the station device 130 is not in the wake state, the access point device 120 buffers the data packet and pauses data transmission to the station device 130.

In the FIG. 1 example, the host 110 can include a driver controller 111 and a bus interface 112. The driver controller 111 is configured to construct a data packet addressed to a station device. The bus interface 112 is used for data transmission and reception between the host 110 and the access point device 120.

As shown, the access point device 120 includes a bus interface 121, a hardware-based direct data streaming (HDDS) circuit 122 (or a streaming circuit), a medium access controller (MAC) circuit 123, a transceiver 124, a control circuit 125, and an antenna 126.

The bus interface 121 is coupled to the bus interface 112 of the host 110 and used for data transmission between the host 110 and the access point device 120. Both bus interfaces 112 and 121 can be any suitable bus interface, such as Universal Serial Bus (USB), Serial Digital Input/Output (SDIO), or Peripheral Component Interconnect Express (PCIe). It is noted that the types of the bus interfaces 112 and 121 can be the same or different. If the types of the bus interfaces 112 and 121 are different, an interface converter which converts the type of the bus interface 112 to the type of the bus interface 121 and vice versa may be used between them.

The HDDS circuit 122 is coupled between the bus interface 121 and the MAC circuit 123 and configured to move data packets from the bus interface 121 to the MAC circuit 123, and vice versa. During data transmission, the HDDS circuit 122 receives the data packets addressed to a station device from the interface 121 and transmits the data packets to the MAC circuit 123. The HDDS circuit 122 also receives the data packets sent from a station device from the MAC circuit 123 and transmits the data packets to the bus interface 121.

According to an aspect of the disclosure, the HDDS circuit 122 is also configured to determine whether a sleep status of the station device that the data packets are addressed to is in a wake state or in a sleep state. If it is determined that the sleep status of the station device that the data packets are addressed to is in the wake state, then the HDDS circuit 122 sends the data packets from the bus interface 121 to the MAC circuit 123. Alternatively, when the sleep status of the station device that the data packets are addressed to is in the sleep state, then the HDDS circuit 122 moves the packets from the bus interface 121 to the control circuit 125.

The HDDS circuit 122 also includes a bit mask 122-1 that can be used to determine a sleep status of a respective station device. The bit mask 122-1 includes a plurality of bits with each bit corresponding to a sleep status of a separate station device. In an embodiment, a bit set to 0 indicates that a sleep status of a corresponding station device is in a sleep state, while a bit set to 1 indicates that the sleep status of the corresponding station device is in a wake state. In the FIG. 1 example, when the station device 130 is associated with the access point device 120, an index to a bit in the bit mask 122-1 is assigned by the access point device 120 to the station device 130. The station device 130 sends to the access point device 120 a data packet including a PM bit indicating a sleep status of the station device 130. After receiving the data packet, the access point device 120 becomes aware of the sleep status of the station device 130 and adjusts the bit in the bit mask 122-1 corresponding to the station device 130 to update the sleep status of the station device 130. If the PM bit indicates that the station device 130 is in the sleep state, the bit in the bit mask 122-1 is adjusted to 0, while if the PM bit indicates that the station device 130 is in the wake state, the bit in the bit mask 122-1 is adjusted to 1.

According to an aspect of the disclosure, the access point device 120 is implemented according to an open systems interconnection model (OSI model) with a plurality of layers, such as a physical (PHY) layer, a media access control (MAC) layer, a network layer, and the like from bottom up. In an example, the PHY layer includes the transceiver 124 and baseband processing circuit (not shown in FIG. 1). Further, in the example, the MAC layer is implemented using a mix of hardware and software (e.g., firmware). For example, the MAC layer includes a lower portion implemented in hardware circuits, and a higher portion implemented as a processor executing software instructions.

In the FIG. 1 example, the MAC circuit 123 is configured to receive data packets from the HDDS circuit 122 and the control circuit 125. After receiving the data packets, the MAC circuit 123 buffers, parses, and processes the data packets. Then the MAC circuit 123 transmits the processed data packets to the transceiver circuit 124. The MAC circuit 123 includes a plurality of queues, such as MAC_Qs 123-1 and 123-2, which are configured to buffer data packets from the HDDS circuit 122. The MAC circuit 123 also includes a queue, such as MAC_FM_Q 123-3, which is configured to buffer data packets from the control circuit 125.

In addition, the MAC circuit 123 is also configured to detect a sleep status of a station device by parsing a PM bit in a data packet sent by the station device. When the MAC circuit 123 detects a reception of a PM bit, it notifies the control circuit 125 to take corresponding actions. In an embodiment, the MAC circuit 123 detects a sleep state of a station device and then notifies the control circuit 125 so that the control circuit 125 adjusts a bit in the bit mask 122-1 corresponding to the station device to indicate the station device is in the sleep state. Similarly, when the MAC circuit 123 detects a wake state of the station device, it notifies the control circuit 125 to adjust the bit in the bit mask 122-1 so that the HDDS circuit 122 is aware that the station device is in the wake state.

The transceiver circuit 124 is configured to receive and transmit wireless signals. The transceiver circuit 124 includes a receiver circuit 124-1 and a transmitter circuit 124-2. The receiver circuit 124-1 is configured to generate electrical signals in response to captured radio frequency (RF) signals by the antenna 126, process the electrical signals to extract digital streams from the electrical signals. The transmitter circuit 124-2 is configured to receive digital streams, such as management frames, data frames, and the like, generate radio frequency signals to carry the digital streams, and emit the radio frequency signals in the air via the antenna 126 to transmit wireless signals that carry the digital streams.

It is noted that in an example, the access point device 120 can include multiple antennas, and the receiver circuit 124-1 and the transmitter circuit 124-2 can be coupled to separate antennas.

The access point device 120 can further include the control circuit 125 that is configured to control at least the HDDS circuit 122 and the MAC circuit 123 in order to control data transmission between the HDDS circuit 122 and the MAC circuit 123. The control circuit 125 includes a plurality of power save queues, such as PS_Qs 125-2, 125-3, and 125-4, to store data packets addressed to station devices. Each of the plurality of queues corresponds to a separate station device. In an example, PS_Q 125-2 stores data packets addressed to the station device 130, PS_Q 125-3 stores data packets addressed to the station device 140, and PS_Q 125-4 stores data packets addressed to the station device 150. In addition, the control circuit 125 also includes a queue (e.g., FM_Q 125-1) for data transmission between the HDDS circuit 122 and the control circuit 125, as well as data transmission between the MAC circuit 123 and the control circuit 125. The control circuit 125 receives data packets from either the HDDS circuit 122 or the MAC circuit 125 and queues them into the FM_Q 125-1. Then the control circuit 125 moves the data packets in the FM_Q 125-1 to a corresponding power save queue. In an example, the control circuit 125 receives data packets addressed to the station device 130 either from the HDDS circuit 122 or from the MAC circuit 125, queues the data packets in the FM_Q 125-1, and then moves the data packets from the FM_Q 125-1 to the PS_Q 125-2 that corresponds to the station device 130.

In an embodiment, when being notified by the MAC circuit 123 that a station device (e.g., the station device 130) is entering into a sleep state (i.e., PM0→1), the control circuit 125 locks the MAC circuit 123 so that data packets that are addressed to the station device 130 and queued in MAC queues (e.g., MAC_Qs 123-1 and 123-2) are not transmitted to the transceiver 124. Additionally, the control circuit 125 suspends the data transmission through the HDDS circuit 122, so that data packets that are received by the bus interface 121 and addressed to the station device 130 are not transmitted to the MAC circuit 123 through the HDDS circuit 122. Then the control circuit 125 retrieves the data packets that are addressed to the station device 130 and queued in MAC queues (e.g., MAC_Qs 123-1 and 123-2) from the MAC queues and buffers the data packets in the FM_Q 125-1 of the control circuit 125. After retrieving the data packets from the MAC circuit 123, the control circuit 125 unlocks the MAC circuit 123 to resume transmission of data packets that are addressed to station devices (e.g., the station devices 140 and 150) in the wake state and queued in the MAC queues. In addition, the control circuit 125 adjusts the bit for the station device 130 in the bit mask 122-1 to indicate the sleep state of the station device 130 and then resumes data transmission through the HDDS circuit 122.

Once the data transmission through the HDDS circuit 122 is resumed, the HDDS circuit 122 dispatches the data packets addressed to the station device in the sleep state (e.g., the station device 130) to the FM_Q 125-1 and notifies the control circuit 125 by sending an interrupt signal, while it dispatches the data packets addressed to the station devices in wake state (e.g., the station devices 140 and 150) to the MAC circuit 123. When being notified by the interrupt signal from the HDDS circuit 122, the control circuit 125 walks through the FM_Q 125-1, identifies the data packets addressed to the station device in the sleep state (e.g., the station device 130), and moves the data packets to a power save queue for the station device in the sleep state (e.g., the station device 130). In addition, the control circuit 125 checks a status of a watermark of the power save queue for the station device in the sleep state (e.g., the station device 130). If it is determined that the power save queue reaches a predetermined high watermark level, the control circuit 125 sends a TX_PAUSE event to the host 110 through bus interfaces 112 and 121, so that the host 110 suspends the transmission of data packets towards the station device in the sleep state (e.g., station device 130). The control circuit 125 also updates a Traffic Indication Map (TIM) Information Element (IE) in a beacon frame to notify the buffer status to the station device in the sleep state (e.g., the station device 130). Once the station device in the sleep state is aware that the access point device 120 has buffered data packets for the station device to be transmitted, the station device in the sleep state begins entering into the wake state and becomes ready for data packets reception.

In embodiments, when being notified by the MAC circuit 123 that a station device (e.g., the station device 130) is entering into a wake state (i.e., PM1→0), the control circuit 123 suspends the data transmission through the HDDS circuit 122 so that data packets that are received by the bus interface 121 and addressed to the station device are not transmitted to the MAC circuit 123 through the HDDS circuit 122. Then the control circuit 125 retrieves the data packets that are addressed to the station device and queued in the corresponding power save queue, and moves the queued data packets to the MAC circuit 123 in order to keep the data packets transmission order. Then the control circuit 125 checks the status of the watermark of the power save queue for the station device and sends a TX_RESUME event to the host 110 through bus interfaces 112 and 121 if the status of the watermark of the power save queue reaches a predetermined low watermark level, so that the host 110 resumes the transmission of data packets towards the awake station. In addition, the control circuit 125 adjusts the bit for the awake station device in the bit mask 122-1 to indicate the wake state of the station device, and then resumes data packets transmission through the HDDS circuit 122.

It is noted that after the control circuit 125 suspends the HDDS circuit 122 for transmission, the HDDS circuit 122 will not extract data from the bus interface 121, which makes the host 110 stop the transmission if the transmission buffers in the host are full.

It is noted that the station devices 130, 140, and 150 may be the same with, similar with, or different from the access point device 120. But each of the station devices 130, 140, and 150 is configured to have a receiver circuit and a transmitter circuit. In the FIG. 1 example, the station device 130 includes a receiver circuit 131 and a transmitter circuit 132, the station device 140 includes a receiver circuit 141 and a transmitter circuit 142, and the station device 150 includes a receiver circuit 151 and a transmitter circuit 152. One or more of the station devices may be in a sleep or a wake state.

It is also noted that each of the station devices 130, 140, and 150 is associated with the access point device 120, and thus the control circuit 125 of the access point device 120 assigns a separate index to a separate bit in the bit mask 122-1 for each of the associated station devices 130, 140, and 150 during an association. The separate index information is passed to the driver controller 111 along with the associated response to the host 110. Accordingly, the driver controller 111 assigns a corresponding bit in a bitmap for each associated station device. For each data packet addressed to an associated station device, the driver controller 111 sets the corresponding bit in the bitmap in the data packet.

FIG. 2A shows an exemplary data packet 200 addressed to an associated station device and FIG. 2B shows an exemplary function table 210 of the data packet of FIG. 2A, according to embodiments of the disclosure. The data packet 200 includes HDDS header information 201, MAC header information 202, a frame data 203 including a payload information, and a padding data 204 for alignment. The header information 201 also includes a signature field indicating a packet type, a length field indicating a length of the data packet, a MAC ID identifying a MAC circuit entity, and a TxQ ID identifying a MAC queue.

The HDDS header information 201 further includes a bitmap 201-1 of which each bit is mapped to a separate station device. According to an aspect of the disclosure, both the bitmap 201-1 and the bit mask 122-1 have the same size, that is to say, both the bitmap 201-1 and the bit mask 122-1 have the same number of bits. In addition, each bit in the bitmap 201-1 is also associated with the same station as in the bit mask 122-1. In the FIG. 2 example, the bitmap 201-1 has 8 bytes (i.e., 64-bits), and thus the access point device 120 supports up to 64 associated station devices.

In operation, for data packets addressed to a particular station device, a position of the bitmap 201-1 of the HDDS header information 201 corresponding to the particular station device is always set a bit value of '1', while all other positions are set bits value of '0', regardless of whether the associated station is in a sleep or wake state.

As described above, when the corresponding bit in the bit mask 122-1 is set to 1, this indicates that the associated station device is in the sleep state. Accordingly, the HDDS circuit 122 performs a logic BIT AND operation between the bit mask 122-1 and the bitmap 201-1 of the data packet 200. When the corresponding position of the bitmap 201-1 of the data packet 200 is '1', and when the corresponding position of bit mask 122-1 is set to '1', then the result of the logic BIT AND operation returns a value of '1'. Such a non-zero result indicates that the station device is in the sleep state. As a result, instead of being transmitted, the data packet 200 is moved for storage to a corresponding power save queue in the controller 125.

If the corresponding bit in the bit mask 122-1 is set to 0, it indicates that the associated station is in the wake state. Accordingly, the HDDS circuit 122 performs the same logic BIT AND operation between the bit mask 122-1 and the bitmap 201-1. When the corresponding position of the bitmap 201-1 of the data packet 200 is '1', and when the corresponding position of bit mask 122-1 is set to '0', then the result of the logic BIT AND operation returns a value of '0'. Such a zero result indicates that the station device is in the wake state. Accordingly, the data packet is moved to one of MAC queues, for example, MAC_Q 123-1, to be transmitted over the air to the corresponding station device.

FIG. 2C shows an exemplary bitmap 220 and an exemplary bit mask 230 according to an embodiment of the disclosure. As shown, both the bitmap 220 and the bit mask 230 can have the same size (e.g., 64 bits).

According to an aspect of the disclosure, if a position of a bit in the bitmap 220 and a position of a bit in the bit mask 230 are same, the bit in the bitmap 220 and the bit in the bit mask 230 correspond to a same associated station device. In the FIG. 1 example, when a station device (e.g., the station device 130) is associated with the access point device 120, the control circuit 125 of the access point device 120 assigns an index to a bit (e.g., bit 231) in the bit mask 230 to correspond to the associated station device (i.e., the station device 130). This index information is passed to the driver controller 111 of the host 110 along with the associated response to the host 110. The driver controller 111 is responsible for constructing a data packet addressed to a station device. For each data packet addressed to the associated station device (i.e., the station device 130), the driver controller 111 sets a corresponding bit (e.g., bit 221) in the bitmap 220 regardless of the sleep status of the associated station device. The position of the corresponding bit (i.e., bit 221) in the bitmap 220 is the same as the position of the bit (i.e., bit 231) corresponding to the associated station device (i.e., station device 130) in the bit mask 230.

A '1' value in a bit of the bitmap 220 indicates that a data packet is addressed to the station device corresponding to that bit position. In an embodiment, all of the station devices 130, 140, and 150 are associated with the access point device 120. In the same embodiment, bits 221, 222, and 223 in the bitmap 220 are associated to the station devices 130, 140, and 150, respectively, and bits 231, 232, and 233 in the bit mask 230 are similarly associated to the station devices 130, 140, and 150, respectively. In the FIG. 2C example, bit 221 is set to 1 while bits 222 and 223 are set to 0, thus the bitmap 220 indicates the data packet 200 is addressed to the station device 130.

According to an aspect of the disclosure, a bit in the bit mask 230 indicates a sleep status of an associated station device. In an embodiment, the bit setting of 1 indicates a sleep state, while the bit setting of 0 indicates a wake state of the associated station device. In the FIG. 2C example, bit 232 is set to 1 while bits 231 and 233 are set to 0, thus the bit mask 230 indicates that the station device 140 is in the sleep state, while station devices 130 and 150 are in the wake state. Accordingly, by performing a logic BIT AND operation between the bitmap 220 and the bit mask 230, the HDDS circuit 122 obtains a zero result, and hence determines that the data packet 200 should be transmitted to the MAC circuit 123.

FIG. 2D shows an exemplary bitmap 240 and an exemplary bit mask 250 according to an embodiment of the disclosure. In an embodiment, all of the station devices 130, 140, and 150 are associated with the access point device 120. In the same embodiment, bits 241, 242, and 243 in the bitmap 240 are associated to the station devices 130, 140, and 150, respectively, and bits 251, 252, and 253 in the bit mask 250 are associated to the station devices 130, 140, and 150, respectively. In the FIG. 2D example, bit 242 is set to 1, while bits 241 and 243 are set to 0, thus the bitmap 240 indicates the data packet 200 is addressed to the station device 140. In addition, bit 252 is set to 1, while bits 251 and 253 are set to 0, thus the bit mask 250 indicates that the station device 140 is in the sleep state, while station devices 130 and 150 are in the wake state. Accordingly, by performing the logic BIT AND operation between the bit map 240 and the bitmask 250, the HDDS circuit 122 obtains a non-zero result. Accordingly, the data transmission of the data packet 200 is held so that the data packet 200 is saved into a corresponding power save queue, rather than being transmitted to the MAC circuit 123.

Figure 3:
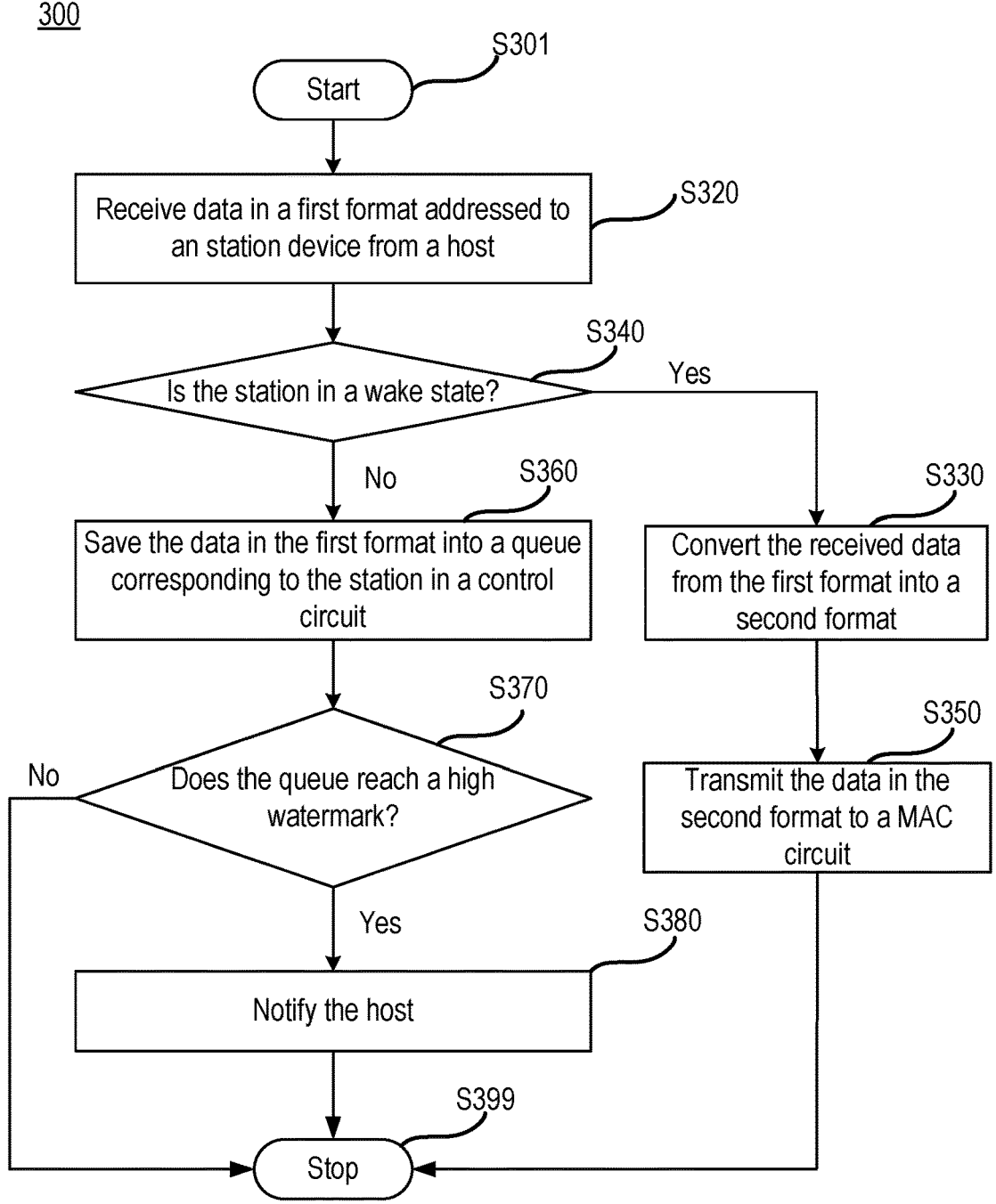
FIG. 3 shows a flowchart of an exemplary data transmission process according to an embodiment of the disclosure.

FIG. 3 shows a flowchart of an exemplary data transmission process 300 for each data packet for transmission, according to embodiments of the disclosure. In an example, the process 300 is executed by the access point device 120. The process starts at S301 and proceeds to S320.

At S320, a data packet in a first format addressed to an associated station device is received. In an example, the bus interface circuit 121 receives from the host 110 a data packet addressed to the station device 130. The data packet includes a plurality of informational bits for the HDDS circuit 122 to parse and process. The plurality of the informational bits includes a signature field indicating a packet type, a length field indicating a length of the data packet, a MAC ID identifying a MAC circuit entity, and a TxQ ID identifying a MAC queue of the MAC circuit entity through which the data packet will be transmitted. The plurality of the informational bits also includes a bitmap having the same bit positions with the bit mask 122-1 of the HDDS circuit 122. That is to say, if a bit in the bitmap is assigned to an associated station device, a bit having the same bit position in the bit mask 122-1 is assigned to indicate a sleep status of the associated station device.

At S340, a sleep status of the associated station device is determined. In an example, the HDDS circuit 122 can perform a logic BIT AND operation between the bitmap and the bit mask to determine the sleep status of the associated station device. The sleep status indicates either a sleep or wake state of the station device. If it is determined that the associated station device is in the wake state, the process 300 proceeds to S330. Otherwise, the process 300 proceeds to S360.

At S330, the received data packet is converted from the first format into a second format. In an example, after receiving the data packet in the first format, the HDDS circuit 122 converts the data packet to the second format by removing the HDDS header.

At S350, when the station device is in the wake state, the data packet is transmitted into a MAC circuit in the second format. Then the process 300 proceeds to and terminates at S399.

At S360, when the station device is in the sleep state, the data packet in the first format is saved into a queue corresponding to the associated sleeping station device. The process 300 then proceeds to S370.

At S370, a level of a watermark of the queue is determined. If it is determined that the level of the watermark of the queue reaches a predetermined high level, the process 300 proceeds to S380 where a TX-PAUSE event is sent to a host so that the host suspends data transmission to the associated station device. Otherwise, the process 300 proceeds to and terminates at S399.

Figure 4:
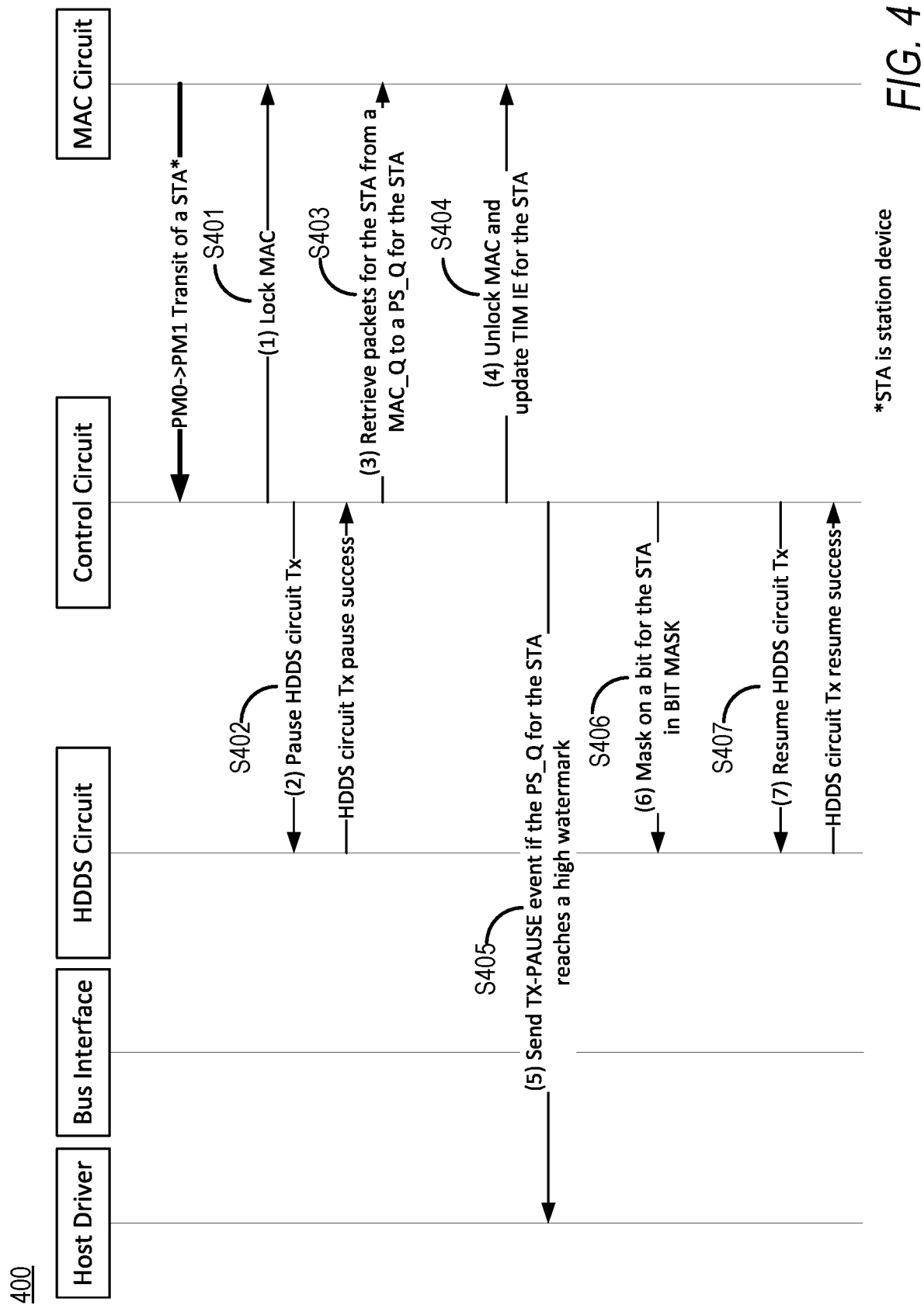
FIG. 4 shows an exemplary control process when a sleep status of an associated station device transits from a wake state to a sleep state, according to an embodiment of the disclosure.

FIG. 4 shows an exemplary control process 400 of an access point device when a sleep status of an associated station device transits from a wake state to a sleep state. In an example, the process 400 is executed by the access point device 120. The process 400 starts operation when a MAC circuit of the access point device detects the sleep state of associated station device. In an example, the process 400 starts operation when the MAC circuit 123 of the access point device 120 detects from the associated station device 130 a reception of a power management (PM) bit set to 1.

At S401, the MAC circuit of the access point device is locked so that data packets stored in the MAC circuit are held.

At S402, the HDDS circuit of the access point device is paused so that transmission of data packets through the HDDS circuit is held.

At S403, once the HDDS circuit is successfully paused, data packets addressed to the associated station device and queued into a queue of the MAC circuit are retrieved from the queue of the MAC circuit and queued into a power save queue corresponding to the associated station device.

At S404, the MAC circuit is unlocked and an information element indicating a buffered packet for the associated station device is updated.

At S405, a level of a watermark of the power save queue corresponding to the associated station device is determined. If the power save queue reaches a predetermined high watermark level, a TX-PAUSE event is sent to the host in order to suspend data transmission towards the associated station device from the host.

At S406, a bit corresponding to the associated station device in the bit mask is set in order to indicate the current sleep status of the associated station device.

At S407, the paused transmission through the HDDS circuit is resumed. The HDDS circuit starts to transfer the data packets addressed to the associated asleep stations from the host through the bus interface to a queue (e.g., the queue FM_Q 125-1 in the FIG. 1 example) in the control circuit. In addition, the HDDS circuit transfers the data packets addressed to the associated awake stations from the host through the bus interface to the MAC circuit.

Figure 5:
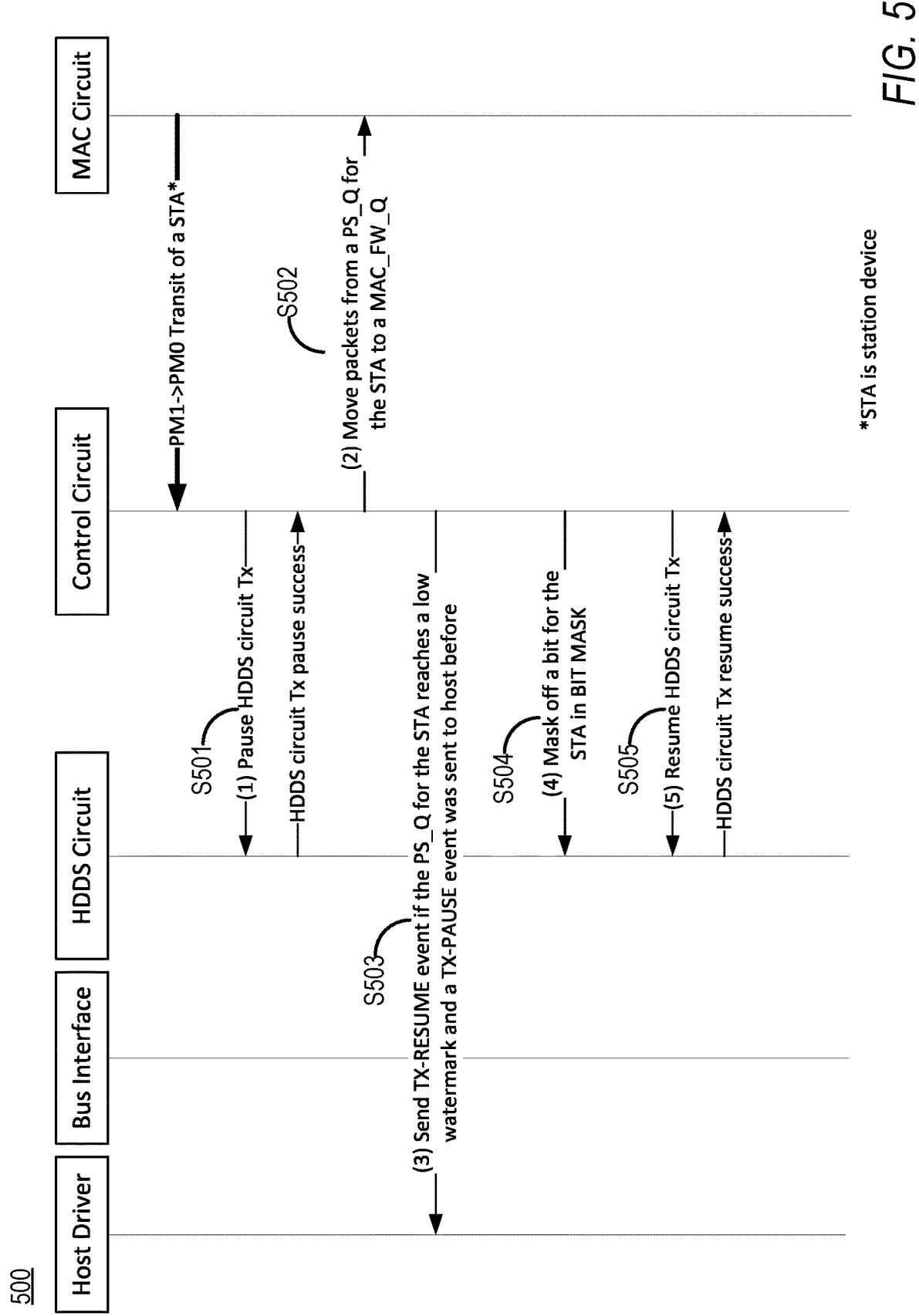
FIG. 5 shows an exemplary control process when a sleep status of an associated station device transits from a sleep state to a wake state, according to an embodiment of the disclosure.

FIG. 5 shows an exemplary control process 500 of an access point device when a sleep status of an associated station device transits from a sleep state to a wake state. In an example, the process 500 is executed by the access point device 120. The process 500 starts operation when a MAC circuit of the access point device detects the wake state of associated station device. In an example, the process 500 starts operation when the MAC circuit 123 of the access point device 120 detects from the associated station device 130 a reception of a power management (PM) bit set to 0.

At S501, data transmission through the HDDS circuit is paused in order to keep the packets transmission order.

At S502, data packets queued into the power save queue for the associated station device are moved to a queue of the MAC circuit dedicated to receive data packets from power save queues, after the HDDS header is removed.

At S503, a level of a watermark of the power save queue corresponding to the associated station device is determined. If the power save queue reaches a predetermined low watermark level and a TX-PAUSE event was sent to the host before, a TX-RESUME event is sent to the host in order to resume data transmission towards the associated station device from the host.

At S504, a bit corresponding to the associated station device in the bit mask is set in order to indicate the current sleep status of the associated station device.

At S505, the suspended transmission through the HDDS circuit is resumed.

In general, each of the processes 300-500 can be suitably adapted by modifying one or more operations in the respective process, adding one or more operations, omitting one or more operations, and the like. For example, an additional operation can be added where a selection of one or more specific processes is made in a process set including the processes 300-500.

At least some of the various processes, operations, and techniques described above may be implemented utilizing hardware, a processor executing firmware instructions, a processor executing software instructions, or any combination thereof. Also, some of the various processes, operations, and techniques may be performed in a different order (and/or concurrently) and still achieve desirable results. When implemented utilizing a processor executing software or firmware instructions, the software or firmware instructions may be stored in any computer readable memory such as on a magnetic disk, and optical disk, or other storage medium, in a random access memory (RAM) or read-only memory (ROM) or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means signal that has one or more of its characteristics set or changed in such a manner as to encode information in the signal. By way of example, and not limitation, communication media includes wire media such as a wired network or direct-wired connection, and wireless media such as acoustic, radio frequency, infrared and other wireless media. Thus, the software or firmware instructions may be delivered to a user or a system via communication channels such as telephone line, a DSL line, cable television line, a fiber optics line, wireless communication channels, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A communication device that transmits data between a host and a plurality of station devices, the communication device comprising:
    an interface circuit configured to receive a data packet from the host, the data packet including a bitmap addressing the data packet to one of the plurality of station devices;
    a medium access controller (MAC) circuit configured to detect a sleep status of the one of the plurality of station devices;
    a control circuit configured to adjust a bit mask based on the sleep status of the one of the plurality of station devices, so that the bit mask indicates the sleep status the one of the plurality of station devices; and
    a streaming circuit coupled between the interface circuit and the MAC circuit, wherein the streaming circuit is configured to
        receive the data packet addressed to the one of the plurality of station devices,
        determine the sleep status of the one of the plurality of station devices based on the bit mask and the bitmap in the data packet, and
        transmit the data packet to the MAC circuit when the sleep status of the one of the plurality of station devices is in a wake state, otherwise, transmit the data packet to the control circuit when the sleep status of the one of the plurality of station devices is in a sleep state.

2. The communication device of claim 1, wherein the control circuit further comprises:
    a queue corresponding to the one of the plurality of station devices, and when the streaming circuit determines that the sleep status of the one of the plurality of station devices is in the sleep state, the streaming circuit transmits the data packet to the queue corresponding to the one of the plurality of station devices.

3. The communication device of claim 1, wherein the sleep status of the one of the plurality of station devices is received by the MAC circuit from the one of the plurality of station devices and the received sleep status is transmitted to the control circuit to update the bit mask to reflect the sleep status of the one of the plurality of station devices.

4. The communication device of claim 3, wherein the control circuit further comprises:
    a queue corresponding to the one of the plurality of station devices, and when the bit mask is changed from the sleep state to the wake state, the control circuit moves data packets previously stored in the queue corresponding to the one of the plurality of station devices to the MAC circuit and updates the bit mask to reflect the wake state of the one of the plurality of station devices.

5. The communication device of claim 3, wherein the control circuit further comprises:
a queue corresponding to the one of the plurality of station devices, and when the bit mask is changed from the wake state to the sleep state, the control circuit moves data packets for the one of the plurality of station devices from the MAC circuit to the queue corresponding to the one of the plurality of station devices and updates the bit mask to reflect the sleep state of the one of the plurality of station devices.

6. The communication device of claim 1, wherein the streaming circuit determines the sleep status of the one of the plurality of station devices by performing a logic BIT AND operation on the bit mask and the bitmap, and the one of the plurality of station devices is determined to be in the wake state when the logic BIT AND operation results in a non-zero value.

7. The communication device of claim 1, wherein the MAC circuit further comprises:
a plurality of first queues for receiving data from the streaming circuit; and
a second queue for receiving data from the control circuit.

8. The communication device of claim 1, wherein the MAC circuit is further configured to:
detect the sleep status of the one of the plurality of station devices by detecting a reception of a power management (PM) bit indicating the sleep status of the one of the plurality of station devices; and
notify the control circuit to update the bit mask to reflect the sleep status of the one of the plurality of station devices.

9. The communication device of claim 1, wherein the control circuit is a firmware that includes a series of instructions stored in a hardware circuit and provides control functions to the hardware circuit.

10. The communication device of claim 1, wherein the control circuit is further configured to:
create a mapping between the one of the plurality of station devices and the bit mask in the streaming circuit; and
transmit the mapping to the host so that the mapping between the one of the plurality of station devices and the bitmap in the data packet is the same as the mapping between the one of the plurality of station devices and the bit mask in the streaming circuit.

11. A method for data communication, the method comprising:
receiving a data packet addressed to a station device from a host, the data packet including a bitmap addressing the data packet to one of a plurality of station devices including the station device;
determining a sleep status of the station device based on the bitmap in the received data packet and a bit mask indicative of the sleep status of the station device, the sleep status including one of a sleep state and a wake state;
transmitting the received data packet to a MAC circuit when it is determined that the sleep status of the station device is in the wake state; and
storing the received data packet in a control circuit when it is determined that the sleep status of the station device is in the sleep state.

12. The method of claim 11, wherein the storing the received data packet in the control circuit further comprises:
storing the received data packet in a queue corresponding to the station device, wherein the queue corresponding to the station device is in the control circuit;
determining a watermark status of the queue corresponding to the station device; and
notifying the host when it is determined that the watermark status of the queue exceeds a predetermined high watermark level.

13. The method of claim 11, wherein the determining the sleep status of the station device further comprises:
determining the sleep status of the station device based on the bitmap in the data packet and the bit mask in a streaming circuit by performing a logic BIT AND operation.

14. The method of claim 13, further comprising:
creating a mapping between the station device and the bit mask in the streaming circuit; and
transmitting the mapping to the host so that the mapping between the station device and the bitmap in the data packet is the same as the mapping between the station device and the bit mask in the streaming circuit.

15. The method of claim 12, further comprising:
detecting the sleep status of the station device; and
adjusting the bit mask based on the detected sleep status of the station device.

16. The method of claim 15, wherein the detecting the sleep status of the station device further comprises:
detecting a reception of a power management (PM) bit indicating the sleep status of the station device; and
notifying the control circuit to adjust the bit mask to reflect the sleep status of the station device.

17. The method of claim 15, when the detected sleep status of the station device is in the sleep state, further comprising:
moving the data packet for the station device from the MAC circuit to the queue in the control circuit corresponding to the station device;
notifying the station device that it has a pending data packet;
determining the watermark status of the queue corresponding to the station device; and
notifying the host when it is determined that the watermark status of the queue reaches the predetermined high watermark level.

18. The method of claim 15, when the detected sleep status of the station device is in the wake state, further comprising:
moving the data packet from the queue corresponding to the station device in the control circuit to the MAC circuit;
determining the watermark status of the queue corresponding to the station device; and
notifying the host when it is determined that the watermark status of the queue reaches a predetermined low watermark level.

19. The method of claim 13, wherein the transmitting the received data packet to the MAC circuit further comprises:
transmitting the received data packet from the streaming circuit to a first queue of the MAC circuit; and
transmitting the received data packet from the control circuit to a second queue of the MAC circuit.

20. A communication device in charge of communication between a host device and station devices, the communication device comprising:
an interface circuit configured to receive data from the host device that is addressed to a station device;
a medium access controller (MAC) circuit configured to detect a sleep status of the station device;

a controller configured to adjust a bit mask based on the sleep status of the station device, so that the bit mask indicates the sleep status of the station device; and a streaming circuit coupled between the interface circuit and the MAC circuit, wherein the streaming circuit is configured to receive the data that is addressed to the station device, and transmit the data to the MAC circuit when the bit mask indicates that the sleep status of the station device is in a wake state.

\* \* \* \* \*